(12) United States Patent
Coles

(10) Patent No.: US 6,359,431 B1
(45) Date of Patent: Mar. 19, 2002

(54) GOLF CART SPEEDOMETER/ODOMETER

(75) Inventor: Roy Coles, Nanoose Bay (CA)

(73) Assignee: Stenten's Golf Cart Accessories, Inc., Sarasota, FL (US)

( * ) Notice: Subject to any disclaimer, the term of this patent is extended or adjusted under 35 U.S.C. 154(b) by 0 days.

(21) Appl. No.: 09/630,014

(22) Filed: Jul. 31, 2000

(51) Int. Cl.[7] .......................... G01P 3/42; G01P 3/487; G01C 22/00
(52) U.S. Cl. .................. 324/174; 324/171; 73/490; 235/95 R; 280/DIG. 5; 377/24.1
(58) Field of Search ................... 324/160, 163, 324/166, 171, 173–175, 207.25; 73/146, 490, 514.39; 180/170; 280/DIG. 5; 235/95 R, 96, 95 B; 377/24.1, 24.2

(56) References Cited

U.S. PATENT DOCUMENTS

| | | | |
|---|---|---|---|
| 3,710,246 A | * | 1/1973 | Herring ................... 324/174 X |
| 3,898,437 A | | 8/1975 | Butler |
| 4,044,471 A | * | 8/1977 | Peterson ................. 377/24.1 X |
| 4,083,423 A | * | 4/1978 | Williams et al. ......... 324/174 X |
| 4,480,310 A | | 10/1984 | Alvarez |
| 4,532,710 A | * | 8/1985 | Kinney et al. ......... 235/95 R X |
| 4,680,454 A | | 7/1987 | Zeaman et al. |
| 4,807,265 A | | 2/1989 | Swanson |
| 4,832,505 A | * | 5/1989 | Hattori et al. |
| 5,214,679 A | | 5/1993 | Metcalf |
| 5,438,518 A | | 8/1995 | Bianco et al. |
| 5,600,113 A | | 2/1997 | Ewers |
| 5,684,284 A | | 11/1997 | Lee et al. |

* cited by examiner

Primary Examiner—Gerard R. Strecker
(74) Attorney, Agent, or Firm—Edward M. Livingston, Esq.

(57) ABSTRACT

A golf-cart speedometer/odometer has a rotation-mark collar (1) on a cart-wheel rim (2) that signals rotation to a rotation sensor (4) on a housing extension (5) from a cart-axle housing (6). Measurement of rotation of the rotation-mark collar from rotation of the cart-wheel rim is communicated electrically from the rotation sensor to a readout console (8) having a speedometer (10), a resettable long-distance odometer (11) in metric or English and a resettable short-distance odometer (12) in metric or English readout. Rotation-marking of the rotation-mark collar is preferably with a plurality of magnets (3). Optionally, the rotation-marking of the rotation-mark collar can utilize a plurality of four magnetic-material markers for a rotation-sensor magnet to decrease magnetic field that could damage computers or medical equipment in the vicinity. Further optional, the rotation-marking of the rotation-mark collar can utilize a plurality of four mechanical trippers (31) and trippets (32).

20 Claims, 3 Drawing Sheets

GOLF CART SPEEDOMETER/ODOMETER

BACKGROUND OF THE INVENTION

This invention relates to golf cart speedometers and odometers having electrical readout from a magnetic sensor in working relationship between an axle housing and a wheel rim.

Use of speedometers and odometers on golf carts as on other motorized vehicles is well known. None are known, however, to have readout of cart speed, drive distance, and lifetime-distance from a sensor attachable to an axle housing for rotational input from a rotation-mark collar on a wheel rim in a manner taught by this invention.

Examples of most-closely related known but yet different speedometers and odometers for golf carts are described in the following patent documents. U.S. Pat. No. 4,807,265, issued to Swanson on Feb. 21, 1989, described magnets on a hubcap plate for rotational encounter with a sensor extended radially from an internal bearing in the hubcap plate for electrical communication to an odometer on a golf cart. Similar to odometers on commercial trailers and other vehicle axles for evaluating tire mileage, U.S. Pat. No. 4,680,454 issued to Zeaman, et al. on Jul. 14, 1987, described a plurality of magnets in a wheel rim for rotational encounter with a sensor on a non-rotational pendulum for electronic communication to an odometer on the pendulum.

Examples of related but further different known speedometers and odometers for golf carts are described in the following patent documents. U.S. Pat. No. 5,684,284 issued to Lee, et al. on Nov. 4, 1997, described a stride-counter for measuring distance of walking to a golf ball from a strike position. U.S. Pat. No. 5,600,113, issued to Ewers on Feb. 4, 1997, described a yardage meter with rotational readout from an outside circumference of a golf-cart wheel. U.S. Pat. No. 5,438,518, issued to Bianco, et al. on Aug. 1, 1995, described a golfer-position indicator with satellite communication to the golfer. U.S. Pat. No. 5,214,679, issued to Metcalf on May 25, 1993, and U.S. Pat. No. 3,898,437, issued to Butler on Aug. 5, 1975, both described golf-cart odometers with rotational readout from an outside periphery of a golf-cart wheel.

SUMMARY OF THE INVENTION

Objects of patentable novelty and utility taught by this invention include convenient golf-cart attachment of a speedometer/odometer that also measures drive distances and calculates remaining fairway distances.

This invention accomplishes these and other objectives with a golf-cart speedometer/odometer having a rotation sensor positioned outward radially from an outside periphery of a cart-axle housing to proximity of an inside periphery of a rotation-mark collar on an inside periphery of a cart-wheel rim. Measurement of rotation of the rotation-mark collar from rotation of the cart-wheel rim is communicated electrically from the rotation sensor to the golf-cart speedometer/odometer which is positioned preferably proximate a dashboard of the golf cart for trip-distance readings in yards or meters in addition to speed and cumulative distance. Rotation-marking of the rotation-mark collar is preferably with a plurality of four mark magnets separated ninety degrees apart for a rotation sensor having a communication of passage of the four mark magnets for quarter turns of the cart-wheel rim. Optionally, the rotation-marking of the rotation-mark collar can be accomplished with a plurality of four magnetic-material markers to decrease magnetic field that could damage computers or medical equipment in the vicinity. Further optional, the rotation-marking of the rotation-mark collar can be with mechanical actuators for a mechanical rotation sensor.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF DRAWINGS

This invention is described by appended claims in relation to description of a preferred embodiment with reference to the following drawings which are explained briefly as follows:

DESCRIPTION OF PREFERRED EMBODIMENT

Figure 1:
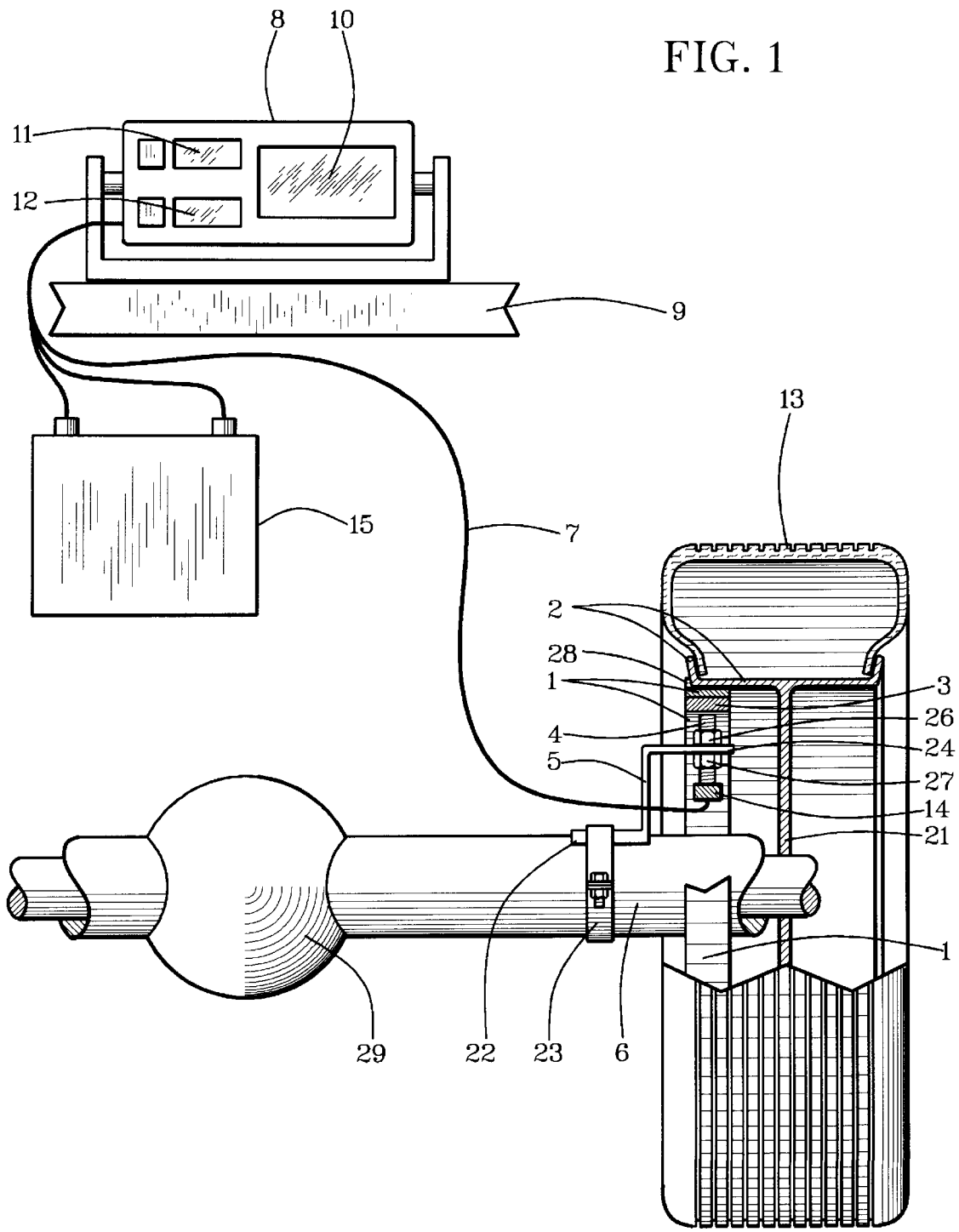
FIG. 1 is a partially cutaway front view of an embodiment having a rotation-mark collar with magnetic marks sensed by a rotation sensor with nearness adjustment on a Z-bracket housing extension for rotation communication to a golf-cart speedometer/odometer.

Listed numerically below with reference to the drawings are terms used to describe features of this invention. These terms and numbers assigned to them designate the same features throughout this description.

1. Rotation-mark collar
2. Cart-wheel rim
3. Collar magnet
4. Rotation sensor
5. Housing extension
6. Cart-axle housing
7. Communicator
8. Readout console
9. Golf-cart dashboard
10. Speedometer
11. Long-distance odometer
12. Short-distance odometer
13. Cart-wheel tire
14. Amplifier
15. Battery
16. Circumference adjuster
17. First end
18. Second end
19. Adjustment bolt
20. Adjustment base
21. Cart wheel
22. Arcuate base leg
23. Hose clamp
24. Sensor-attachment member
25. Sensor-attachment orifice
26. First sensor nut -continued 27. Second sensor nut
28. Rim guide
29. Differential
30. Filler ring
31. Tripper
32. Trippet Referring to FIGS. 1–2, a rotation-mark collar 1 has an outside periphery proximate an inside periphery of a cart-wheel rim 2. The rotation-mark collar 1 has an inside peripheral portion on which at least one rotation marker, represented by a collar magnet 3, is positioned. A rotation sensor 4 is affixed rigidly to a housing extension 5, which can be a Z-bracket, that is extended rigidly from an outside periphery of a cart-axle housing 6. The rotation sensor 4 is positioned predeterminedly and preferably adjustably proximate the inside peripheral portion of the rotation-mark collar 1. The rotation sensor 4 is structured to detect rotational passage of the rotation maker, such as the collar magnet 3, for communication through a communicator 7 to a readout console 8 that is positioned within predetermined cart-driver vision such as on a golf-cart dashboard 9. The readout console 8 has a speedometer 10, a long-distance odometer 11 and a short-distance odometer 12 that are actuated through the communicator 7 in metering correlation with an outside circumferential perimeter of a cart-wheel tire 13 on the cart-wheel rim 2.

Metric or English readings are optional for the speedometer 10, the long-distance odometer 11 and the short-distance odometer 12. The long-distance odometer 11 is resettable selectively in miles or kilometers and the short-distance odometer 12 is resettable selectively in yard or meters.

For a preferred use of a plurality of four of the collar magnets 3 spaced approximately ninety degrees apart circumferentially as rotation markers, the rotation sensor 4 is triggered by the magnet on the at least one rotation marker in predetermined proximity to the rotation sensor 4 causing the sensor to close and pass a charge of +5 volts DC from the battery 15 to the readout console 8.

Figure 2:
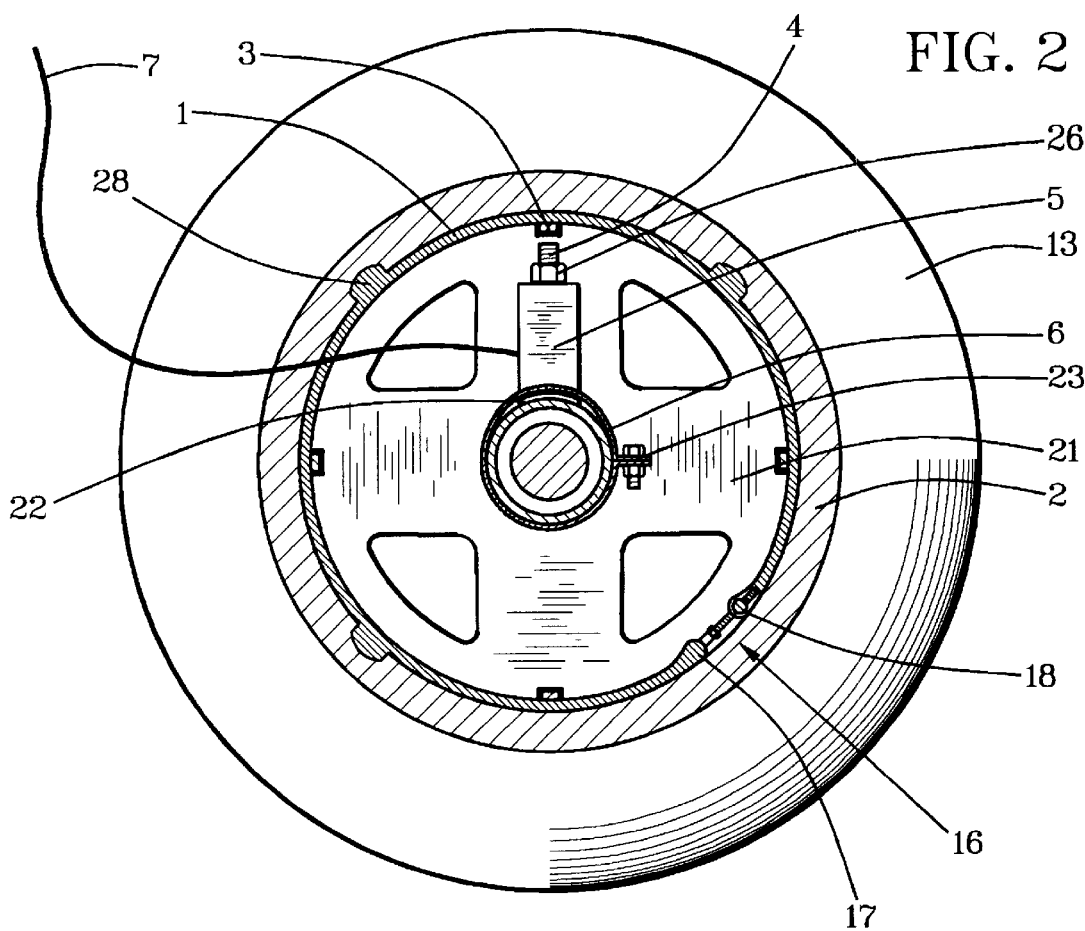
FIG. 2 is a side view of the FIG. 1 rotation-mark collar with magnetic marks sensed by a rotation sensor with nearness adjustment on a Z-bracket housing extension.
Figure 3:
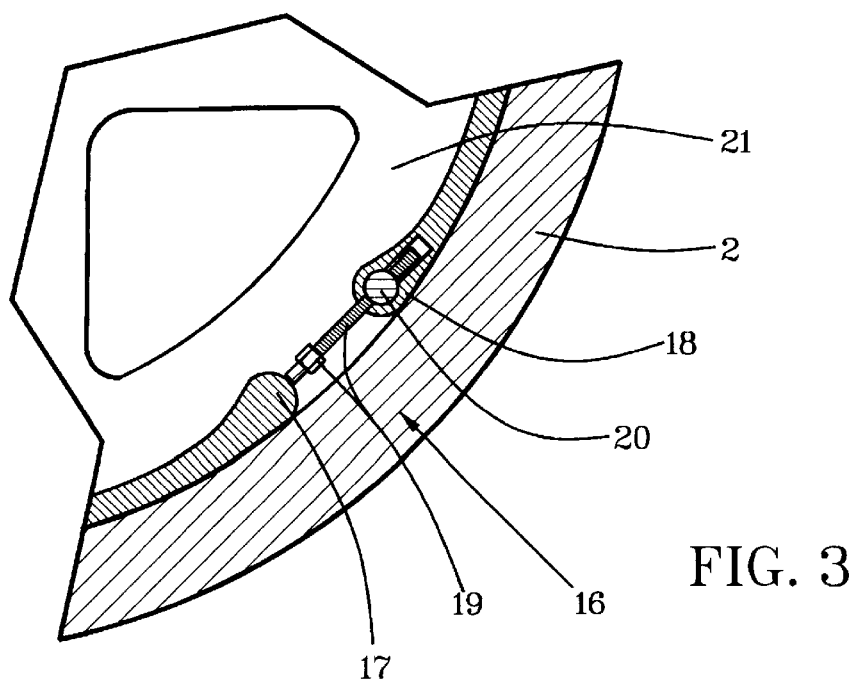
FIG. 3 is an enlarged view of a circumference adjuster of the rotation-mark collar shown in FIGS. 1–2.

Referring to FIGS. 1–3, the rotation-mark collar 1 can be predeterminedly flexible circumferentially and, for quick attachment and detachment, can have a circumference adjuster 16 positioned intermediate a first end 17 and a second end 18 that are juxtaposed circumferentially proximate the inside periphery of the cart-wheel rim 2. A fitting distance between the first end 17 and the second end 18 is increased for tightening the rotation-mark collar 1 against the cart-wheel rim 2 by rotating an adjustment bolt 19 outwardly from an adjustment base 20. Conversely for loosening the rotation-mark collar 1 from contact with an inside periphery of the cart-wheel rim 2, the adjustment bolt 19 is rotated inwardly towards the adjustment base 20. The adjustment bolt 19 and the adjustment base 20 have matched machine threading. The cart-wheel rim 2 is generally cylindrical on a cart wheel 21.

Further for quick attachment to and detachment from golf carts, the housing extension 5 can be a Z-bracket with an arcuate base leg 22 strapped to the cart-axle housing 6 with a hose clamp 23 and a sensor-attachment member 24 parallel to an axis of the cart-wheel rim 2. The sensor-attachment member 24 has a sensor-attachment orifice 25 shown in FIGS. 4–5, through which the rotation sensor 4 is inserted. Preferably the rotation sensor 4 has machine threading onto which a first sensor nut 26 is screwed on a first side of the sensor-attachment member 24 and a second sensor nut 27 is screwed onto the machine threading of the rotation sensor 4 on a second side of the sensor-attachment member 24. The first sensor nut 26 and the second sensor nut 27 are positioned in firm contact with oppositely disposed sides of the sensor-attachment member 24 at positions on the rotation sensor 4 that position a sensor tip of the rotation sensor 4 at an adjustably predetermined distance from the inside peripheral portion of the rotation-mark collar 1.

In FIGS. 1–2, the collar magnets 3, whether employed as magnets or as magnetic material, are free-standing projections that protrude inward radially at least as far as inside surfaces of the first end 17 and the second end 18 of the rotation-mark collar 1 for use of the circumference adjuster 16 for quick attachment to and detachment from the cart-wheel rim 2.

A plurality of rim guides 28 are employed to position the rotation-mark collar 1 a predetermined distance from an inboard side of the cart wheel 21. A differential 29 is shown to indicate positioning the rotation sensor 4 and the rotation-mark collar 1 on inboard sides of cart wheels 21, even though the cart wheel 21 may be a front or back wheel.

Figure 4:
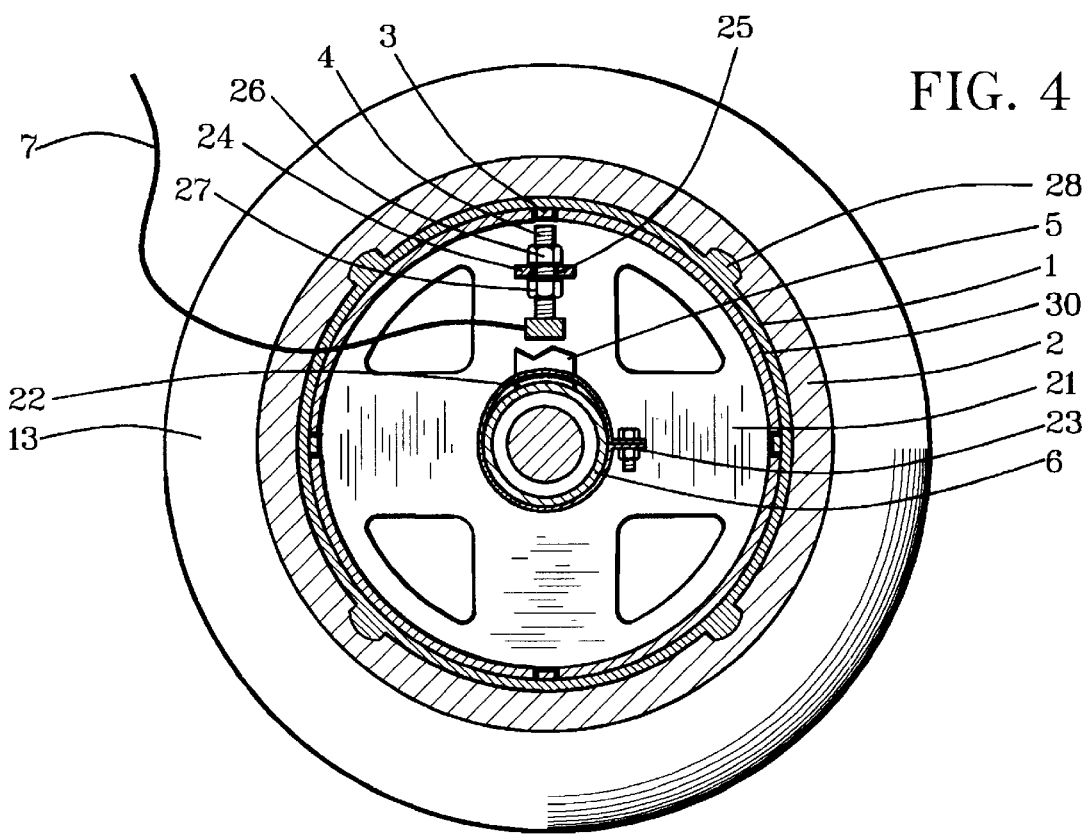
FIG. 4 is a side view of a rotation-mark collar with optionally either magnetic or magnetic-material marks sensed by a rotation sensor with optionally either opposite-pole magnets or magnetic material and having nearness adjustment on a Z-bracket housing extension.

Referring to FIG. 4, optionally to attachment of the rotation-mark collar 1 to the cart-wheel rim 2 with the circumference adjuster 16, rigid and permanent attachment can be provided. The rotation-mark collar 1 can be built rigidly or permanently onto the cart wheel 21. A filler ring 30 can be employed to fill space between the collar magnets 3 to achieve a smooth and clean rotation-mark collar 1 with less tendency to attract foreign materials. A wiper can be employed to keep a smooth rotation-mark collar 1 clean and thus to further diminish force of magnetic field required.

Wheel build-in can be either after-market add-on or OEM fabrication of this golf-cart speedometer/odometer. For OEM fabrication, structure for positioning of the housing extension 5 can be built into the cart-axle housing 6.

Figure 5:
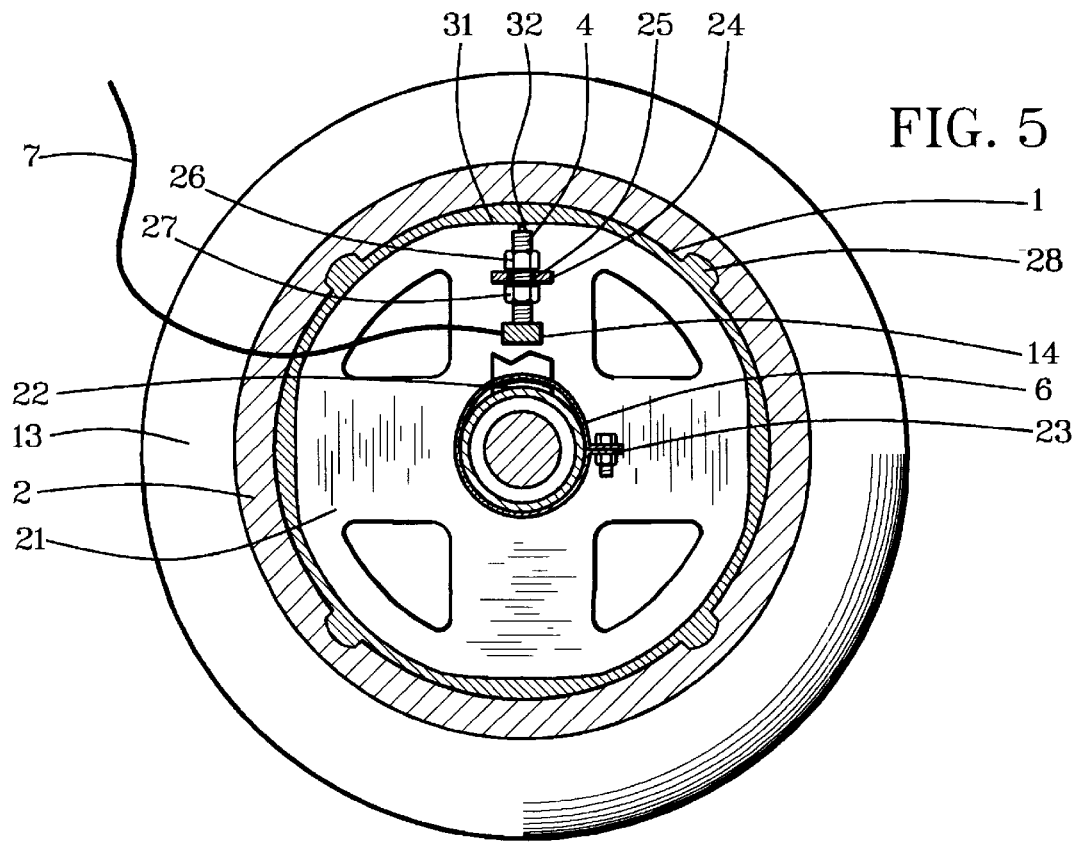
FIG. 5 is a side view of a rotation-mark collar with a trippet that is tripped by a tripper on a rotation sensor for rotation communication to a golf-cart speedometer/odometer.

Referring to FIG. 5, optional to magnets and magnetic material can be a tripper 31 for the rotation-mark collar 1 and a trippet 32 on the rotation sensor 4 for mechanical actuation of the rotation sensor 4 to generate rotation signaling for communication through the communicator 7 to the readout console 8. A selection of trippers 31 and trippets 32 in addition to a depicted plunger-like trippet 32 are known for this application. Their advantage is complete elimination of magnetic field that could interfere with computer and health-care equipment. Their disadvantage is mechanical wear. Either can be made to be appropriate for particular use conditions.

A new and useful golf-cart speedometer/odometer having been described, all such foreseeable modifications, adaptations, substitutions of equivalents, mathematical possibilities of combinations of parts, pluralities of parts, applications and forms thereof as described by the following claims and not precluded by prior art are included in this invention.

What is claimed is:

1. A golf-cart speedometer/odometer comprising:
   a rotation-mark collar supported proximate an inside periphery of a cart-wheel rim;
   at least one rotation marker positioned on the rotation-mark collar;
   a rotation sensor affixed rigidly to a housing extension that is extended rigidly from an outside periphery of a cart-axle housing;
   the rotation sensor being positioned predeterminedly proximate an inside peripheral portion of the rotation-mark collar;

the rotation sensor being structured and positioned to detect rotational passage of the at least one rotation marker on the rotation-mark collar;

a readout console positioned within predetermined cart-driver vision on the golf cart;

the readout console having a speedometer, a long-distance odometer and a short-distance odometer; and a communicator of rotation of the rotation-mark collar in communication from the rotation sensor to the readout console for actuation of the speedometer, the long-distance odometer and the short-distance odometer in metering correlation with an outside circumferential perimeter of a tire on a cart wheel on which the cart-wheel rim is positioned.

2. The golf-cart speedometer/odometer of claim 1 wherein:

the at least one rotation marker is a magnet; and the rotation sensor is activated by the rotational passage of the at least one rotation marker on the rotation-mark collar for communication to the readout console.

3. The golf-cart speedometer/odometer of claim 2 wherein:

the at least one rotation marker includes a plurality of collar magnets that are spaced apart circumferentially on the rotation-mark collar.

4. The golf-cart speedometer/odometer of claim 2 wherein:

the collar magnet has low-power magnetism and the communicator of rotation of the rotation-mark collar includes an amplifier for communication of weak signals of the low-power magnetism to the readout console.

5. The golf-cart speedometer/odometer of claim 4 wherein:

the plurality of collar magnets have low-power magnetism and the communicator of rotation of the rotation-mark collar includes an amplifier for communication of weak signals of the low-power magnetism to the console.

6. The golf-cart speedometer/odometer of claim 1 wherein:

the at least one rotation marker includes collar magnetic material; and the rotation sensor is activated by the rotational passage of the at least one rotation marker on the rotation-mark collar for communication to the readout console.

7. The golf-cart speedometer/odometer of claim 6 wherein:

the at least one rotation marker includes a plurality of collar magnetic materials that are spaced ninety degrees apart circumferentially on the rotation-mark collar.

8. The golf-cart speedometer/odometer of claim 6 wherein:

the sensor magnet has low-power magnetism and the communicator of rotation of the rotation-mark collar includes an amplifier for communication of weak signals of the low-power magnetism to the console.

9. The golf-cart speedometer/odometer of claim 1 wherein:

the at least one rotation marker includes a tripper; and the rotation sensor includes a trippet that is actuated by the rotational passage of the rotation sensor by the rotation marker on the rotation-mark collar for communication to the readout console.

10. The golf-cart speedometer/odometer of claim 9 wherein:

the at least one rotation marker includes a plurality of trippers that are spaced ninety degrees apart circumferentially on the inside peripheral portion of the rotation-mark collar.

11. The golf-cart speedometer/odometer of claim 10 wherein:

the rotation sensor includes an amplifier for communication of trip signals from the trippet to the console.

12. The golf-cart speedometer/odometer of claim 1 wherein:

the rotation-mark collar is predeterminedly flexible circumferentially;

a circumference adjuster is positioned intermediate a first end and a second end of the rotation-mark collar that are juxtaposed circumferentially proximate the inside periphery of the cart-wheel rim;

the circumference adjuster being expandable to increase a fitting distance intermediate the juxtaposed first end and second of the rotation-mark collar for tightness of fit of an outside peripheral portion of the rotation-mark collar against the inside periphery of the cart-wheel rim; and the circumference adjuster being contractible to decrease the fitting distance intermediate the juxtaposed first end and second of the rotation-mark collar for looseness of fit of an outside peripheral portion of the rotation-mark collar against the inside periphery of the cart-wheel rim.

13. The golf-cart speedometer/odometer of claim 12 wherein:

the circumference adjuster includes an adjustment bolt that is threaded select distances into an adjustment base in the first end of the rotation-mark collar.

14. The golf-cart speedometer/odometer of claim 1 wherein:

the housing extension is attached rigidly to the outside periphery of the cart-axle housing with a clamp and has a sensor-attachment member parallel to an axis the cart-wheel rim.

15. The golf-cart speedometer/odometer of claim 14 wherein:

the sensor-attachment member has a sensor-attachment orifice through which a rotation sensor is inserted;

the rotation sensor has machine threading a predetermined length;

a first sensor nut is screwed onto the machine threading of the rotation sensor on a first side of the sensor-attachment member and a second sensor nut is screwed onto the machine threading of the rotation sensor on a second side of the sensor-attachment member; and the first sensor nut and the second sensor nut are positioned in firm contact with oppositely disposed sides of the sensor-attachment member at positions on the rotation sensor that position a sensor tip of the rotation sensor at a predetermined distance from the inside peripheral portion of the rotation-mark collar.

16. The golf-cart speedometer/odometer of claim 1 wherein:

the communicator of rotation of the rotation-mark collar is electrical wiring in electrical communication intermediate the rotation sensor and electronic structure on the readout console.

17. The golf-cart speedometer/odometer of claim 1 wherein:

the long-distance odometer has optionally mile or kilometer readout that can be cleared for reset selectively and the short-distance odometer has optionally yard or meter readout that can be cleared for reset selectively.

18. A golf-cart speedometer/odometer comprising:

a rotation-mark collar attached concentrically to a cart side of a cart-wheel;

at least one rotation marker on the rotation-mark collar;

a rotation sensor extended rigidly from an outside periphery of a cart-axle housing to predeterminedly proximate the rotation-mark collar;

the rotation sensor being structured and positioned to detect rotational passage of the rotation marker on the rotation-mark collar;

a readout console having a speedometer, a long-distance odometer and a short-distance odometer; and a communicator of rotation of the rotation-mark collar in communication from the rotation sensor to the readout console for actuation of the speedometer, the long-distance odometer and the short-distance odometer in metering correlation with an outside circumferential perimeter of a tire on a cart wheel on which the cart-wheel rim is positioned.

19. A golf-cart speedometer/odometer comprising:

a rotation-mark collar supported proximate an inside periphery of a cart-wheel rim of rear wheel of a golf cart;

a plurality of magnets are positioned as rotation markers on the rotation-mark collar;

a rotation sensor affixed rigidly to a housing extension that is extended rigidly from an outside periphery of a cart-axle housing;

the rotation sensor being positioned predeterminedly proximate an inside peripheral portion of the rotation-mark collar;

the sensor magnet being structured and positioned to detect rotational passage of the plurality of collar magnets on the rotation-mark collar consecutively;

a readout console positioned within predetermined cart-driver vision on the golf cart;

the readout console having a speedometer, a long-distance odometer and a short-distance odometer; and a communicator of rotation of the rotation-mark collar in communication from the rotation sensor to the readout console for actuation of the speedometer, the long-distance odometer and the short-distance odometer in metering correlation with an outside circumferential perimeter of a tire on a cart wheel on which the cart-wheel rim is positioned.

20. The golf-cart speedometer/odometer of claim 19 wherein:

the collar magnets have predetermined low-power magnetism and the communicator of rotation of the rotation-mark collar includes an amplifier for communication of weak signals of the low-power magnetism to the console.

* * * * *